United States Patent [15] 3,639,888
Pittman et al. [45] Feb. 1, 1972

[54] PRINTED CIRCUIT BOARD CONNECTOR

[72] Inventors: Robert B. Pittman; Walter P. Kern, both of River Edge, N.J.

[73] Assignee: Industrial Electronic Hardware Corporation, New York, N.Y. by said Pittman

[22] Filed: Jan. 15, 1970

[21] Appl. No.: 3,036

[52] U.S. Cl. ....................339/75 MP, 339/176 MP
[51] Int. Cl. ....................H01r 13/54
[58] Field of Search ....................339/74, 75, 176

[56] References Cited

UNITED STATES PATENTS

| | | | |
|---|---|---|---|
| 3,130,351 | 4/1964 | Giel | 317/101 |
| 3,475,717 | 10/1969 | Lane | 339/75 MP |
| 3,478,301 | 11/1969 | Conrad et al. | 339/75 MP |

OTHER PUBLICATIONS

IBM Technical Disclosure Bulletin, Uberbacher, Vol. 9, No. 3, p. 254, Aug. 1966

*Primary Examiner*—Joseph H. McGlynn
*Attorney*—James and Franklin

[57] ABSTRACT

A printed circuit board connector comprises a base and a series of contacts mounted on the base and exposed at their front sections. Structure is operatively connected to the base opposing and spaced from the contact front sections so as to define therebetween a space for receiving a printed circuit board. A backing member is articulately mounted on the base and located immediately behind the back section of the contacts. This backing member is movable between a first position in which it engages the contacts and presses them toward the opposing structure and a second position more remote from the opposing structure than the first position. As a result of this movement of the backing member, the contacts exert a greater or lesser force on a printed circuit board which is located in the space, depending upon whether the backing member is in its first or second position respectively. The backing member, which is in the preferred embodiment releasably engaged with the base, may be slidably or flexibly moved between the first and second positions.

12 Claims, 6 Drawing Figures

INVENTOR.
ROBERT B. PITTMAN
WALTER P. KERN
BY
James and Franklin
ATTORNEYS

INVENTOR.
ROBERT B. PITTMAN
WALTER P. KERN
BY James and Franklin
ATTORNEYS

PRINTED CIRCUIT BOARD CONNECTOR

This invention relates to electrical connectors, and more specifically to a connector for use with a printed circuit board.

Printed circuit boards are in widespread use in electronic apparatus such as electronic data processing computers. On those boards the various circuits are formed by conducting paths, usually on the side surface of the boards. The conducting paths are terminated at the edge of the circuit board where an electrical connection is made with electrical contacts which are a part of a circuit board connector. The connector is usually of the type comprising a housing with a plurality of signal-carrying contacts received in slots arranged along the housing. The edge of the printed circuit board is itself inserted into a space in the housing in a manner such that the conducting path terminations at the edge of the board are in a position to engage and make electrical connection with the connector contacts. As a result of this electrical connection, input signals may be applied to appropriate parts of the circuitry on the board and output signals may be taken from other appropriate parts of that circuitry.

One major problem currently causing concern to manufacturers of this type of equipment is that of providing a properly sized receiving space within the housing of the connector so that the circuit board may be inserted and removed without causing damage or excessive wear to either the connector contacts or the conducting paths on the board. Within limits, the greater the pressure which a contact exerts on the conducting termination on the printed circuit board, the better is the electrical connection which results, and this is usually a very important factor, particularly when the very low voltages involved in computer input and output signals are concerned. HIgh contact pressure also acts to more reliably maintain the board in operative position relative to the connector. However, the greater the contact pressure the harder it is to insert and remove the board from the connector, the greater the possibility that the board might not be pushed all the way in when it is inserted, the more wear on the contacts and particularly the very thin conducting terminations, and the greater the possibility of stressing the contacts beyond their elastic limit and thus producing permanent deformation.

To overcome this problem it is highly desirable to provide a connector which receives a printed circuit board in a fully slidable nondamaging engagement between the board and the contacts and yet is adapted to urge the contacts quite strongly into engagement with the board after the board is properly positioned in the connector. To accomplish this, however, present connectors require auxiliary equipment such as an elongated key which is inserted into the connector at an appropriate position, and which is then rotated to drive the contacts into a tight engagement with the board. However, this type of connector is obviously undesirable since it requires special and extraneous equipment to effect a proper connection between the appropriate parts. Furthermore, such an assembly procedure is time-consuming and therefore further disadvantageous.

It is a primary object of the present invention to provide a connector which easily receives a printed circuit board, and which may readily be adjusted to provide a strongly pressurized engagement between the contact terminals and the board after the board is positioned in the connector.

It is another object of the present invention to provide a connector which is characterized by the ease of assembly of the connector parts and the operative uniting of connector and printed circuit board.

The present invention overcomes the aforementioned difficulties and satisfies the above objects by a printed circuit board connector which comprises a base, a series of electrically conductive contacts mounted on the base. The contacts have front and back sections, and are exposed at their front sections. The base has structure opposing and spaced from the front sections of the contacts so as to define therebetween a space for receiving a printed circuit board. A backing member is articulately mounted on the base and located immediately behind the back sections of the contacts. The backing member is movable between a first position in which it engages the contacts and presses them into the space, and a second position more remote from the opposing structure than the first position. As a result of this movement the contacts are caused to exert a greater or lesser force on a printed circuit board positioned in the space, depending upon whether the backing member is in its first or second position. With this structure a printed circuit board may readily be inserted into and removed from the space when the backing member is in its second position. When the backing member is in its first position a good electrical contact is effected between the contacts and the conductive paths on the side surfaces of the printed circuit board.

In the preferred embodiment, the opposing structure which is useful to define the receiving space also comprises a backing member mounted on the base member. In this embodiment, the series of contacts are arranged in first and second longitudinal rows extending axially of the elongated base. The contacts of the two rows are positioned in opposite relation and are acted upon by the two backing members respectively. Movement to the first position for each of the backing members may be effected by a resilient means detachably operatively connected to the backing members and effective to urge them to their first positions. Upon the detachment of this resilient means the backing members are released for movement to the second positions.

The movable connection of the backing members to the base may be accomplished by a variety of structures. In one such structure the base is provided with a plurality of receptacles which are adapted to receive downwardly extending tab members operatively attached to the lower sections of the backing members. The receptacles are provided with an opening having a thickness dimension greater than that of the tab member, so that the tab member is loosely held in the receptacle when inserted therein. With this structure the backing member is free to move between first and second positions upon the application and release of a force thereto, due to the movement of the smaller tab in the enlarged receptacle opening. A holding engagement between the backing members and the base is accomplished by providing a finger on each of the tab members, the finger being effective to grasp the base member after the tab is inserted into the receptacle. In the preferred form, the finger is resilient and is retracted to a withdrawn position as it passes through the opening in the receptacle. Subsequently, it snaps to its normally projected position and engages the base. With this construction the backing members are swingably movable on the base, and are held against withdrawal by the resilient finger on the tab members. Separation of the backing members from the base may be achieved if desired by reversing the insertion process above described, that is, by again retracting the resilient finger passing the tabs upwardly through the receptacle.

To the accomplishment of the above, and to such other objects as may hereinafter appear, the present invention relates to a printed circuit board connector as defined in the appended claims, and as illustrated in the accompanying drawings, in which:

Figures 1, 2:
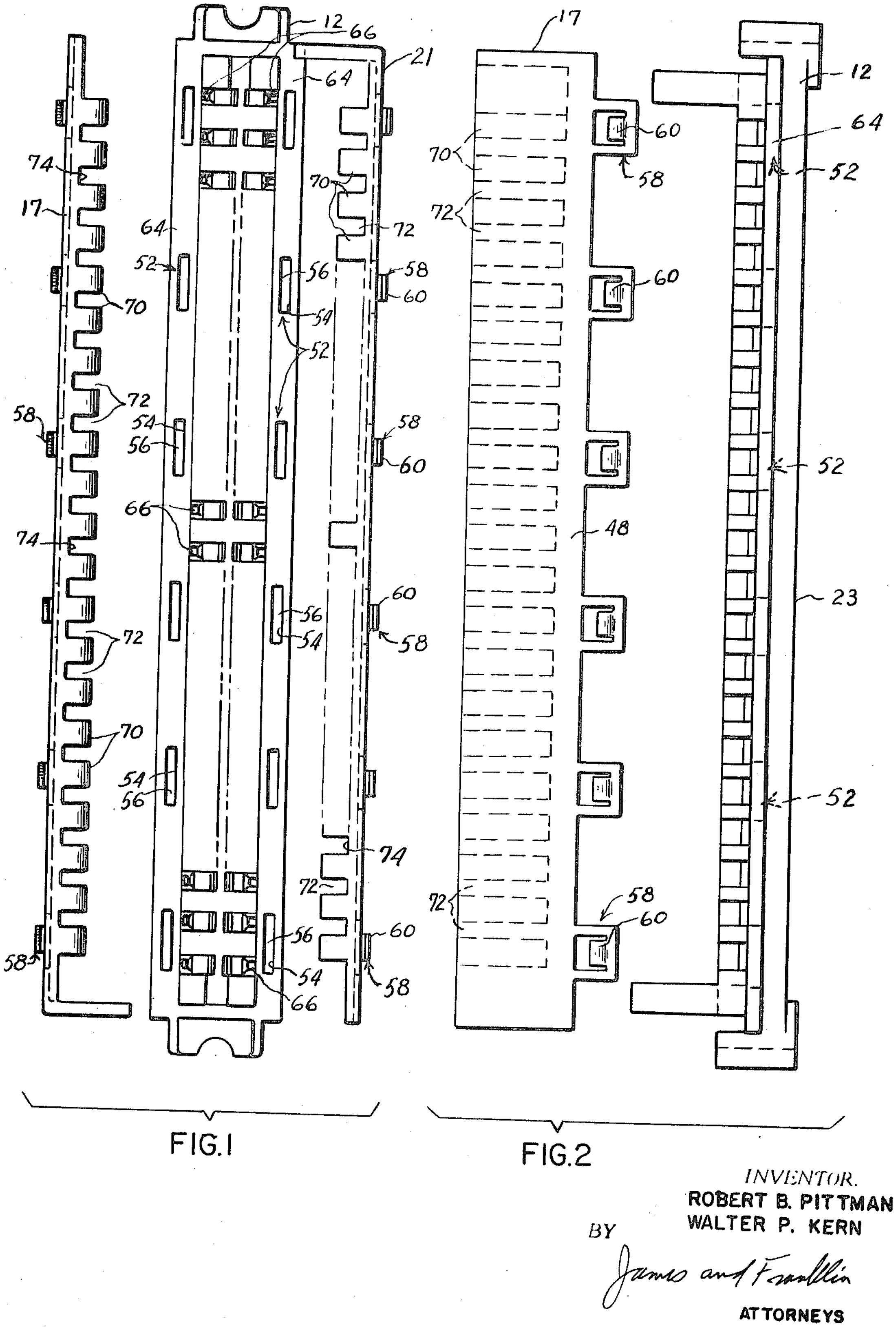
FIG. 1 is an exploded top plan view of a connector base and two backing members prior to the assembly thereof.
FIG. 2 is an exploded side elevational view of the base and one of the backing members of FIG. 1 prior to the assembly thereof.
Figures 4, 5:
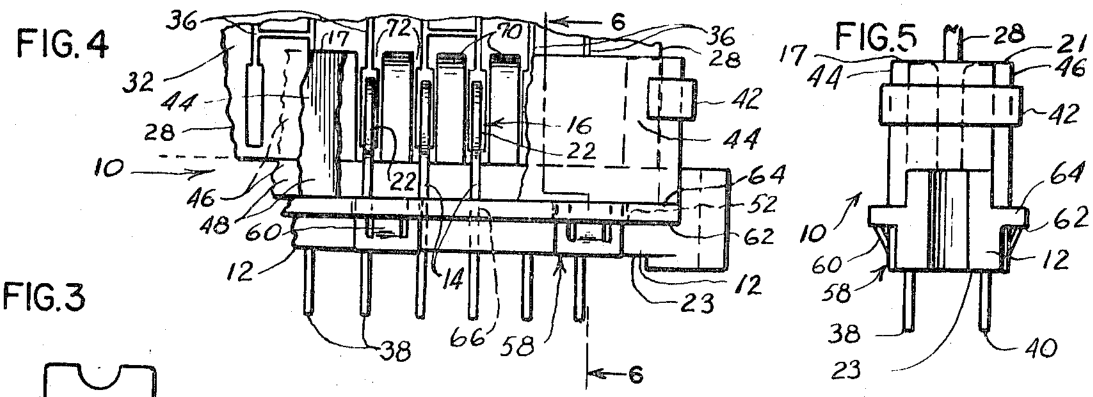
FIG. 4 is a fragmentary side elevational view partly broken away of a printed circuit board in an assembled condition in the connector of FIG. 1.
FIG. 5 is a front elevational view of the connector and board assembly illustrated in FIG. 4.

The printed circuit board connector of the present invention is generally designated 10, and comprises a base 12, and a series of contacts generally designated 14 operatively connected to the base 12. In the embodiment illustrated the contacts 14 are arranged to form a first row 16 and a second row 18, each row extending longitudinally of the base member 12. The contacts 14 of row 16 are exposed at their front sections 20 and are supported at their back sections 22 by a backing member generally designated 17. An opposing structure generally designated 19 is positioned opposite the front sections 20 of contacts 14, thereby defining a space 27 for receiving a printed circuit board 28. The board 28 is provided on its exposed side surface 32 with conductive path terminations 36 opposite the contacts 14. These terminations may take the form of thin copper strips. The backing member 17 is movable between a first position, shown by the solid lines in FIG. 6, in which it engages the back sections 22 of the contacts 14 and presses them into the space 27 and against the conductive path terminations, and a second position shown by the broken lines in FIG. 6 in which it is more remote from the space 27 than when in its first position. The contacts 14 are caused to exert a greater or lesser force on the printed circuit board terminations 36 depending upon whether the backing member is in its first or second position. In the illustrated embodiment the opposing structure 19 itself comprises a second backing member 21 which is also movable between a first position (solid lines) and a second position (broken lines). This backing member 21 is active upon the contacts 14 in the row 18, engaging the back sections 26 when it is in its first or solid line position, and urging the front sections 29 thereof into engagement with the terminations 36 on the board 28. When the front sections 20 and 29 of the contacts 14 in the rows 16 and 18 respectively engage the terminations 29 on opposite surfaces 32 and 34 of the board 28 in this manner, they make appropriate electrical connections with the terminations 36, and hence to the circuitry (not shown) on the board 28. Each of the contacts 14, therefore, is connected to a part of the circuitry on the printed circuit board. An electrical connection to the contacts 14 from external circuitry (not shown) may be made by a suitable connection to the lower extending contact sections 38 and 40 which project beyond the lower surface 23 of the base 12.

The backing members 17 and 21 are effective to urge the contacts 14 of opposed rows 16 and 18 into a pressurized engagement with the side surfaces 32 and 34 of the board 28 to provide a good electrical connection with the conducting areas 36. For this purpose a force-generating means, such as the resilient clip 42, is operatively connected to the outer surfaces 44 and 46 of these backing members, and is effective to force the members into engagement with the back sections 22 and 26 of the contacts 14. As a result, the contacts 14 are pressed into the space 27 and against the board 28. When the clip 42 is removed from the members 17 and 21, these members are free to move to the position shown by the broken lines. The engagement force of these members on the contacts 14 is thereby reduced, thus enabling the printed circuit board 28 to be removed from or inserted into the space 27 without substantial frictional engagement with the front sections 20 and 29 of the contacts 14.

The movement of the backing members 17 and 21 between their respective first and second positions may be accomplished in a number of ways. In the embodiment illustrated each backing member 17 and 21 is provided with a lower section 48 of reduced cross-sectional area relative to an upper section 50. The base 12 provided with a plurality of receptacles such as at 52, which comprise an opening 54 and a passage 56 having a thickness dimension greater than that of the cross-sectional area of lower section 48. As a result, the lower section 48 is free to move laterally in the receptacle 52 between its first and second positions. Thus, when the spring clip 42 is connected to the backing members 17 and 21 the lower sections 48 of these members are urged laterally to the first position shown by the solid lines. When the clip 42 is removed, these members 17 and 21 are loosely positioned in the receptacles 52 and are free to slide laterally to the second position shown by the broken lines by the application of a slight pressure such as may occur by the removal or insertion of the board 28 in the space 27. This lateral movement may also be provided by constructing the backing members 17 and 21 of a flexible material such as a thermoplastic. Materials such as Nylon (registered trade mark) are quite suitable for this purpose. With this material composition, these members may be held tightly in the receptacles 52 and flexed slightly forward into engagement with the contacts 14 when the clip 42 is applied. When clip 42 is removed the lower sections 48 of the backing members 17 and 21 are flexed backwardly away from the contacts 14.

Figure 6:
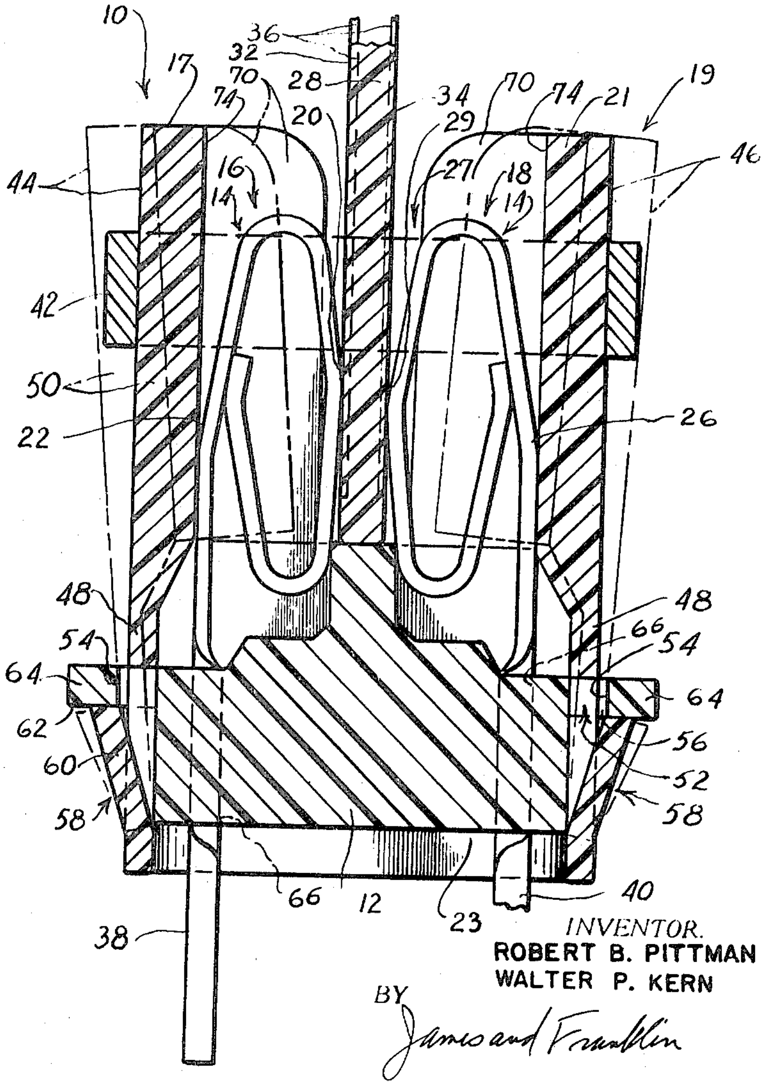
FIG. 6 is a cross-sectional view on an enlarged scale taken approximately on line 6—6 of FIG. 4.

In the illustrated embodiment the backing members 17 and 21 are initially separated from the base 12, as shown in FIGS. 1 and 2. They are provided with a plurality of downwardly projecting tabs 58. These tabs 58 are spaced along the backing members 17 and 21 so as to be positioned in corresponding receptacles 52 in the base 12. $Each Each the tab members 58 is provided with a resilient finger 60 which projects outwardly from the tab member in a normal first position shown best in FIG. 6. These resilient fingers 60 are effective to retract to a second position so as to enable the tab members 58 to pass through the opening 54 in the receptacles 52. As shown in FIG. 6 these spring fingers 60 are adapted to project outwardly to their normal positions once the tab 58 is passed through the opening 54. In this position the finger 60 engages the lower surface 62 of the flanged section 64 on the base 12. The backing members 17 and 21 are then held against withdrawal but are maintained in a swingable condition relative to the base 12. If desired, the backing members 17 and 21 may be withdrawn from the base 12 by pressing the finger 60 to its retracted position and lifting the members from the base.

Figure 3:
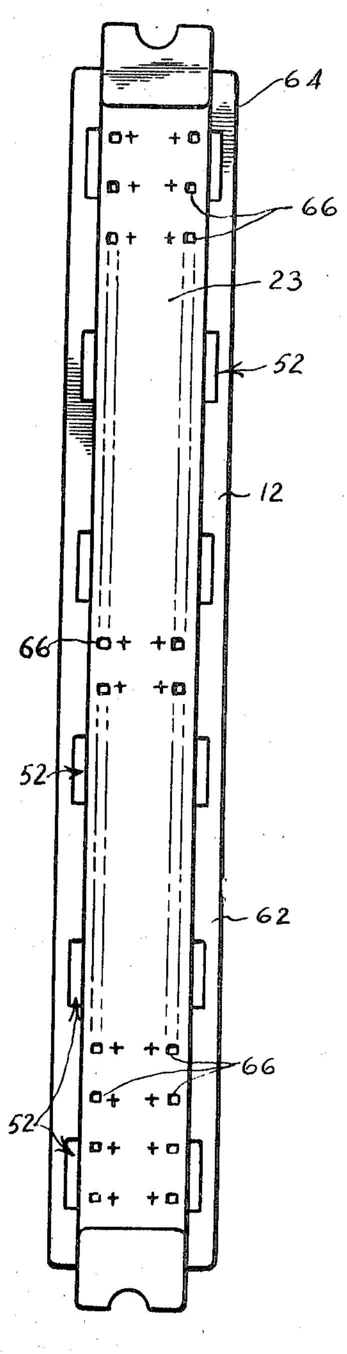
FIG. 3 is a bottom plan view of the base of FIG. 1.

As shown in FIG. 3, the base 12 is provided with a plurality of receiving holes 66 which are spaced axially along the elongated base member 12. These receiving holes 66 are adapted to receive the contacts 14 in properly spaced positions and in aligned opposing rows as above mentioned. The receptacles 52 are positioned between receiving holes 66 so as not to interfere with the terminals upon the insertion of the backing members 17 and 21.

The backing members 17 and 21 may be provided with lateral extensions 70 shown best in FIGS. 1 and 6 which define spaces 72 in which contacts 14 are positioned after assembly of the connector 10. The inside wall 74 at the rear section of the defined spaces 72 engages the backs 22 and 26 of the contacts 14 when the assembly is in the condition shown by the solid line illustration of FIG. 6. The extensions 70 partially enclose and thereby isolate the contacts 14 thus facilitating handling and servicing procedures.

From the foregoing, it will be appreciated that the connector of the present invention solves an important problem with a relatively simple and economical construction. Damage to the printed circuit board which is placed into the connector and damage to the contacts of the connector itself is avoided and excellent electrical connection is assured by the novel design of the connector. In addition, the connector may be quickly and easily assembled by simply inserting the backing members into the base, thereby further enhancing the overall value of the connector to manufacturer and consumer alike.

While only a single embodiment of the invention has been described it will be apparent that many modifications may be made without departing from the scope of the invention as defined in the appended claims.

I claim:

1. A printed circuit board connector comprising a base, a series of compressible contacts fixedly mounted thereon and exposed at their fronts, opposing structure on said base opposite and spaced from said contact fronts so as to define a space for receiving a printed circuit board in engagement with said contacts and a backing member releasably swingably mounted on said base independently of said contacts and located immediately behind the back of said contacts and movable between a first position compressively engaging said contacts and pressing said contacts into said space, and a second positioned more remote from said space than said first position thereby to cause said contacts to exert a greater or lesser force on a printed circuit board in said space as a result of the compression thereof between said circuit board and said backing member depending upon whether said backing member is in its first or second position respectively, and means detachably operatively connected to said backing member and active thereon to urge it to its first position.

2. A printed circuit board connector comprising a base, a series of contacts mounted thereon and exposed at their fronts, opposing structure on said base opposite and spaced from said contact fronts so as to define a space for receiving a printed circuit board, a backing member articulately mounted on said base located immediately behind the back of said contacts and movable between the first position engaging said contacts, and pressing said contacts into said space, and a second position more remote from said space than said first position, a plurality of downwardly projecting tab members operatively connected to said backing member, a plurality of receptacles formed in said base member and adapted to receive said tab members, and attaching means operatively connected to one of said plurality of tab members and said plurality of receptacles and effective to attach said tab members to said base member when said tab members are positioned in said receptacles.

3. The connector of claim 2, in which said backing member is releasably engaged with said base.

4. The connector of claim 2, in which said opposing structure comprises a second backing member articulately mounted on said base, and movable between a first position relatively close to the front of said contacts and a second position more remote from said contacts.

5. In combination with the connector of claim 4, means detachably operatively connected to said backing members and effective to urge them to their first positions.

6. In the combination of claim 5, in which said means is resiliently active on said backing members.

7. In combination with the connector of claim 2, means detachably operatively connected to said backing member and effective to urge it to its first position.

8. In the combination of claim 7, in which said means is resiliently acting on said backing member.

9. The connector of claim 2, in which said receptacles are provided with openings of a larger thickness dimension than that of said tab members, thereby to loosely receive said tab members and to provide a swingable mounting between said backing members and said base.

10. The connector of claim 9, in which said backing member is releasably engaged with said base.

11. The connector of claim 4, in which said receptacles are provided with openings of a larger thickness dimension than that of said tab members, thereby to loosely receive said tab members and to provide a swingable mounting between said backing members and said base.

12. The connector of claim 11, in which said backing member is releasably engaged with said base.

* * * * *